Fritz Reifenhäuser
Josef Klein
INVENTORS.

Fritz Reifenhäuser
Josef Klein
INVENTORS.

BY

Karl F. Ross
Attorney

United States Patent Office 3,664,796
Patented May 23, 1972

3,664,796
MANIFOLD ARRANGEMENT FOR AN
EXTRUSION ASSEMBLY
Fritz Reifenhauser, Troisdorf, and Josef Klein, Sieglar, Germany, assignors to Reifenhauser KG, Troisdorf, Germany
Filed Aug. 11, 1969, Ser. No. 848,868
Claims priority, application Germany, Aug. 8, 1968,
G 67 51 903
Int. Cl. B29f 3/06
U.S. Cl. 425—208
3 Claims

ABSTRACT OF THE DISCLOSURE

A manifold having a housing connects the plasticizing screw of an extrusion apparatus to several extrusion heads. The worm chamber opens into a primary passage in the housing from which a plurality of secondary passages lead at right angles to the separate molds. At each right-angle junction between primary and secondary passages there is provided a valve in the form of a needle-valve rod cooperating with a valve seat formed at the junction and in line with the primary passage. This valve member is actuatable from outside the housing by screw action to move it toward the seat and adjust or terminate the flow in the secondary passage.

(1) FIELD OF THE INVENTION

Figure 1:
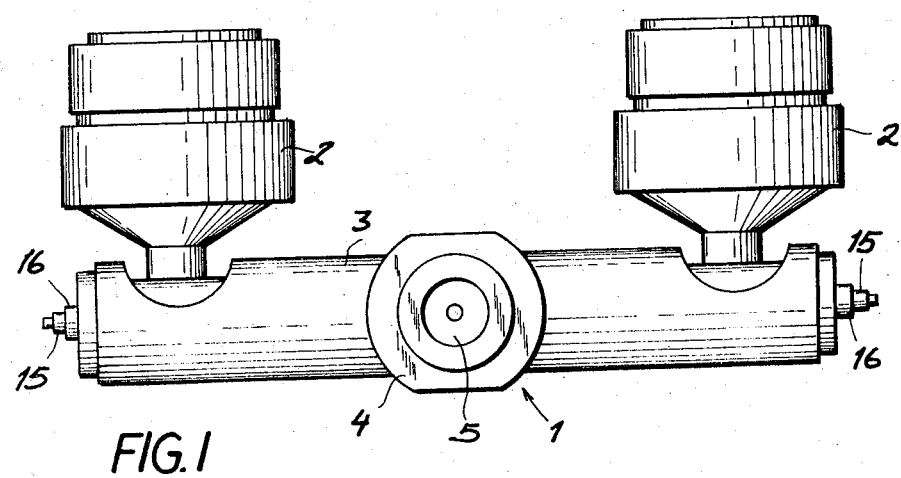

The present invention relates to a manifold arrangement for connecting a plasticizing screw, worm or similar device to several extrusion heads.

(2) BACKGROUND OF THE INVENTION

A single plasticizing apparatus is often coupled to a plurality of extrusion heads, e.g. of a blow-molding installation. A manifold ararngement can be provided for this purpose, the arrangement being mounted on the plasticizing-chamber housing and, in turn, carrying the separate shaping tools, e.g. extrusion dies of blow-molding heads.

In order to ensure that the proper amount of plasticized material is passed into each extrusion head under the proper pressure and at the proper flow rate, it has been necessary heretofore to very carefully dimension and calibrate the manifold arrangement. The primary passage connected to the plasticizing worm and the secondary passages leading therefrom to the individual extrusion heads must be very exactly sized. As a result, such manifold arrangements are often complicated and quite expensive.

A further difficulty which is present in even the best such manifold arrangements is that, should any foreign matter become lodged therein, the arrangement immediately ceases to function properly and must be dismantled and cleaned. Similarly, should one of the extrusion heads malfunction, the entire operation must be stopped until the extrusion head can be serviced, since, one extrusion head cannot be supplied with the synthetic resin while the other is out of operation in prior-art systems.

(3) OBJECTS OF THE INVENTION

It is, therefore, the general object of the present invention to provide an improved extrusion assembly and, in particular, an improved manifold arrangement particularly adapted for use therewith.

A more specific object is to provide an extrusion assembly which overcomes the above-mentioned disadvantages.

Another object is to provide such an extrusion assembly which allows individual extrusion heads to be serviced without stopping the extrusion operation.

Yet another object is to provide an assembly of the above-mentioned type which ensures the proper feeding of each extrusion head, even when different ones are coupled to the same plasticizing device.

(4) SUMMARY OF THE INVENTION

The above objects are obtained, in accordance with the present invention, by an assembly which comprises a plasticizing device with worm or screw, at least two extrusion heads (e.g. provided with blow-molding means), a housing connecting to the plasticizing device and the extrusion heads and formed with primary and secondary passages respectively connected to the plasticizing device and to the extrusion heads, and at least two valve members in the housing and independently actuatable from outside of the housing to restrict the flow cross section at the junctions between the secondary passages and the primary passage.

The valve member can be a pointed needle threaded into a sleeve fitted into a bore in the housing such that rotation of the needle brings its pointed end into engagement with a substantially conical valve seat formed at the junction of the passages. The sleeve and needle are preferably in line with the straight primary passage, and the secondary passages preferably extend orthogonally therefrom. A counternut is provided to lock this needle.

In another embodiment the needle is not threaded but is pushed through the sleeve by threaded actuating means rotatable to advance it. This means is preferably a pin threaded into a nut formed with a flange portion received in a circumferential groove formed between the sleeve and a collar bolted thereon.

According to another feature of the present invention, the sleeve is formed at the passage junction with a beveled end face which serves as a guide surface for the plasticized material passing from the primary into the secondary passage.

Such an assembly allows simple and exact adjustment of the flow cross section at each junction and, therefore, permits the flow therethrough to be regulated with ease. Furthermore, in order to service one mold, the therewith-associated valve member need only be driven in to fully block the flow through the associated secondary passage to allow removal and servicing of the individual molding tool.

(5) DESCRIPTION OF THE DRAWING

Figure 2:
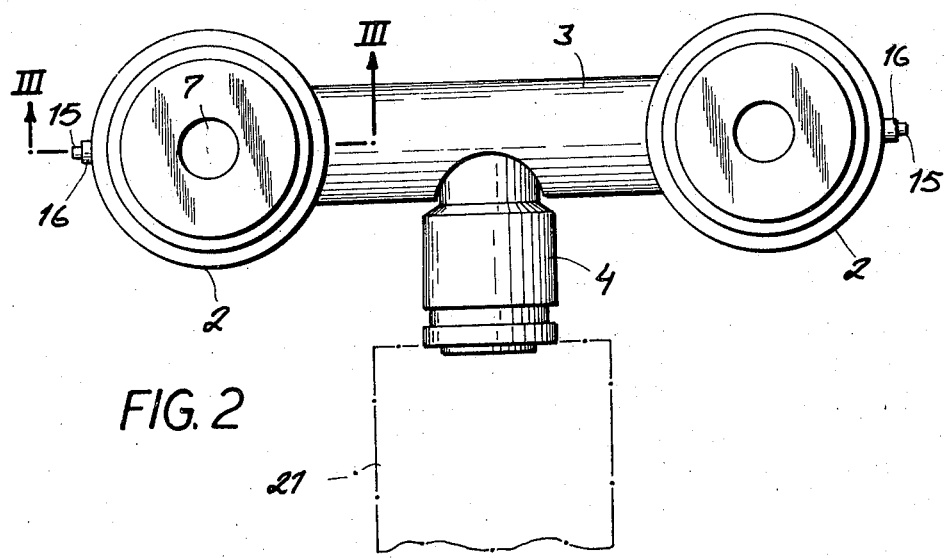
Figure 3:
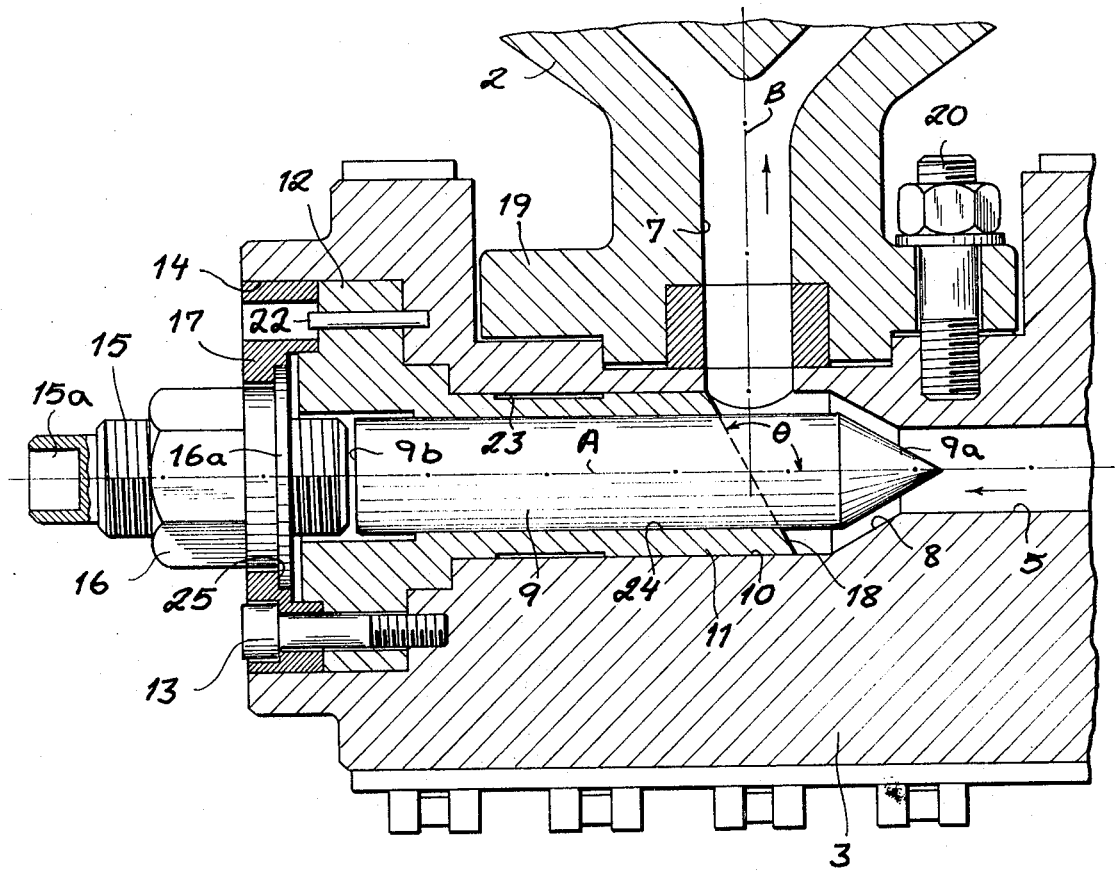
Figure 4:
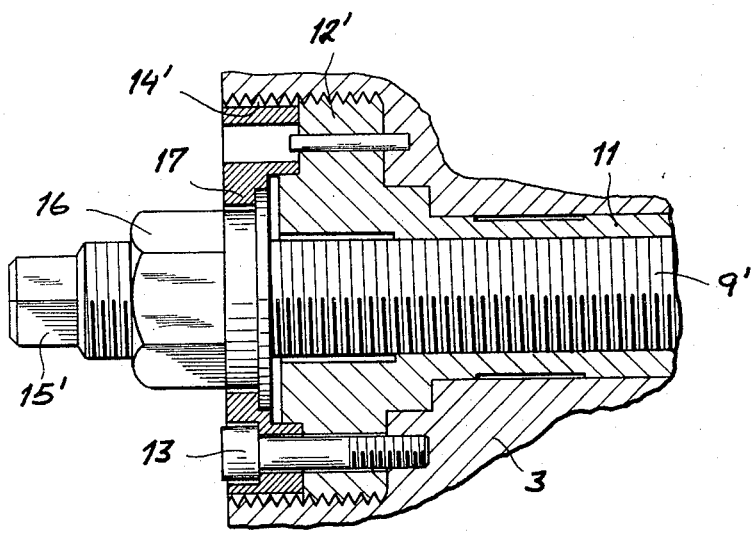

The above and other objects, features, and advantages of the invention will become more readily apparent from the following description, reference being made to the accompanying drawing, in which:

FIG. 1 is a plan view of an assembly according to the present invention;
FIG. 2 is a front elevational view of the assembly shown in FIG. 1;
FIG. 3 is a section taken along the line III—III in FIG. 2, in enlarged scale; and
FIG. 4 is a detailed sectional view, like FIG. 3, showing another embodiment of the present invention.

(6) SPECIFIC DESCRIPTION

As shown in FIGS. 1 and 2, an extrusion assembly comprises an extrusion or plasticizing worm apparatus 21 carrying a manifold arrangement 1 on which are mounted a pair of extrusion heads 2, here blow-molding tools. The plasticizing apparatus 21 is connected to a primary passage 5 by a connecting member 4 and then laterally to both sides towards the extrusion outlets 2 through a manifold housing 3.

FIG. 3 shows one end of the housing 3 in section. The primary passage 5 is straight and has a longitudinal axis A and a branch, secondary passage 7 with an axis B extends perpendicular to the passage 5 and into the mold 2.

Leading out of the housing 3 in line with the axis A is a bore 10 in which a sleeve or bushing 11 is snugly fitted, a circumferential recess 23 being provided in the sleeve to reduce the possibility of binding. This sleeve 11 is formed with a central axial bore 24 and a flange 12, the latter being received in a recess 14 in the housing 3. Inside this bore 24 is a needle 9 having a conical point 9a that is adapted to fit snugly against a frustoconical valve seat 8 formed in the primary passage 5. The sleeve 11 is beveled at its end at an angle $\theta$ to the axis A of about 120° to form an inclined guide surface 18 that guides the plastified resin material up into the passage 7.

Engageable with an end 9b of the needle 9 is a bolt 15, still in line with the axis A, having a square recess 15a in its end protruding from the housing 3 and threaded through a nut 16 having a circumferential flange portion 16a extending perpendicular to the axis A. A collar 17 also received in the recess 14 and bolted on top of the flange portion 12 by bolts 13, pin 22 serving merely to properly position the guide surface 18, forms an annular recess 25 receiving the flange portion 16a.

The mold 2 is held on by the housing 3 by having its mounting flange 19 secured thereagainst by stud-and-bolt arrangements 20 spaced around it.

In order to adjust the flow in the passage 7, the nut 16 is held and the bolt 15 is turned with a key, or vice versa, to advance the bolt 15 against the needle 9 until the desired setting is reached or the end 9a is drawn up tight against the seat 8. In order to retract the needle 9, the bolt 15 or nut 16 is simply turned in the opposite direction and the pressure in the passage 5 serves to drive this needle 9 back.

An alternative embodiment is shown in FIG. 4. Here, instead of a bolt 15 and needle 9, a single long, threaded needle 9' is provided which has a square end 15' and is threaded both in the sleeve 11 and through the bolt 16 while flange portion 12' of the sleeve 11 is threaded into recess 14'. In this manner the needle 9' itself must be rotated to advance or withdraw it, with the nut 16 acting merely as a counternut.

With either embodiment a very accurate adjustment of the flow cross section of any one secondary passage 7 is easily attainable, without affecting the other passages 7. Furthermore, should a mold 2 need changing or servicing, the respective passage 7 can be blocked without the necessity of shutting down the extrusion apparatus 21.

We claim:
1. An extrusion assembly, comprising:
   a manifold provided with an axially extending bore and supply bore opening transversely into said axially extending bore intermediate the ends thereof;
   a plasticizing device connected to said manifold and communicating with said supply bore for feeding an extrudable material through said manifold;
   respective extrusion heads connected to said manifold adjacent respective axial ends thereof, said manifold being provided with respective passages opening transversely into said axially extending bore at the respective ends for communicating between said axially extending bore and said heads, said axially extending bore being formed with an inwardly converging generally frustoconical seat between each of said passages and said supply bore;
   respective axially extending tubular bushings received in said axially extending bore between each of said passages and the respective end of said axially extending bore;
   respective elongated generally cylindrical valve needles slidably received in said bushings and having inwardly directed pointed tips complementarily cooperating with the respective seats for controlling the flow of said material to the respective passage from said axially extending bore; and
   respective screw-thread means acting upon said needles and each including a rotatable threaded element projecting axially beyond said manifold at each end of said axially extending bore for rotation to advance the respective needle, each of said bushings being provided with an end face turned toward the respective seat and inclined to the axis of said bore and leading to the point at which the respective passage opens into said axially extending bore for guiding said material to the respective passage.
2. The assembly defined in claim 1 wherein said screw-thread means includes a threaded portion of each of said valve needles forming the respective threaded element and a screw thread formed on the respective bushing and threadedly receiving said portion of its needle.
3. The assembly defined in claim 1 wherein said screw-thread means includes a nut mounted upon said manifold at each end thereof and a respective one of said elements threadedly received in said nut and adapted to bear axially against the respective valve needle.

References Cited
UNITED STATES PATENTS

| | | | |
|---|---|---|---|
| 277,694 | 5/1883 | Edison | 18—14 R |
| 2,841,821 | 7/1958 | Phipps | 18—8 A |
| 3,238,568 | 3/1966 | Barnett et al. | 18—30 RV |
| 3,278,988 | 10/1966 | Harris | 18—12 R |
| 3,354,506 | 11/1967 | Raley. | |
| 2,227,263 | 12/1940 | Knowles | 18—30 RP |

FOREIGN PATENTS

| | | |
|---|---|---|
| 1,217,564 | 5/1960 | France. |

J. SPENCER OVERHOLSER, Primary Examiner

N. E. LEHRER, Assistant Examiner

U.S. Cl. X.R.

18—14 T, 30 RV